C. THESSEN.
CUP HANDLE.
APPLICATION FILED AUG. 12, 1907.
904,237.
Patented Nov. 17, 1908.
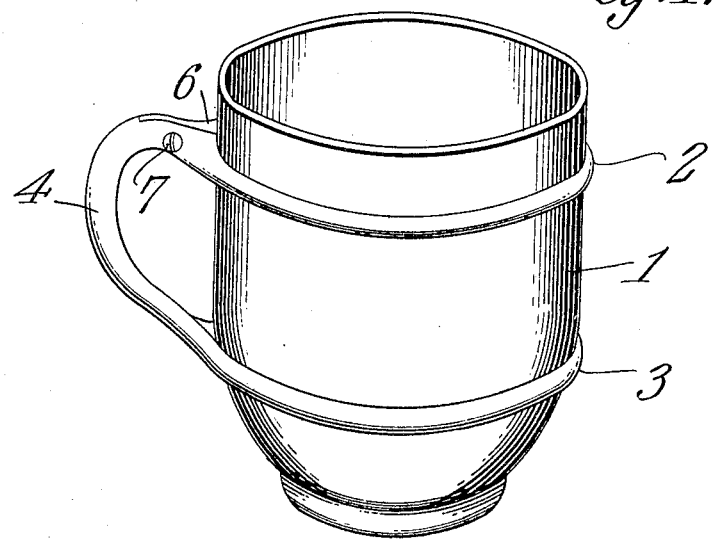
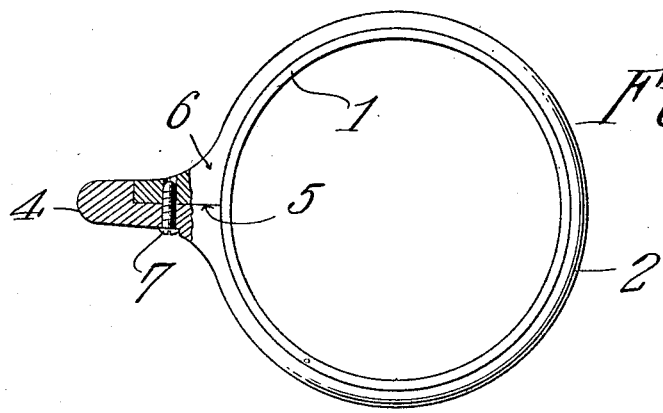
Charles Thessen,
Inventor.

UNITED STATES PATENT OFFICE.

CHARLES THESSEN, OF EVERETT, WASHINGTON.

CUP-HANDLE.

No. 904,237.

Specification of Letters Patent.

Patented Nov. 17, 1908.

Application filed August 12, 1907. Serial No. 388,227.

*To all whom it may concern:*

Be it known that I, CHARLES THESSEN, a citizen of the United States, residing at Everett, in the county of Snohomish and State of Washington, have invented a new and useful Cup-Handle, of which the following is a specification.

This invention has reference to improvements in cup handles, particularly adapted for use with cups from which the original handle has been broken, and for use with cups made without handles.

By means of the present invention, there is provided a handle for a cup which is, for all practical purposes, as firmly connected to the cup as a handle molded thereon, and, since the improved handle may be made of metal, it is practically indestructible under the handling to which cups are usually subjected.

The invention will be best understood from the following detailed description, taken in connection with the accompanying drawings forming part of this specification, in which, Figure 1 is a perspective view of a cup with the improved handle applied thereto, and Fig. 2 is a plan view of the same with parts in section.

Referring to the drawings, there is shown a cup 1 which may be taken as an example of an ordinary cup of porcelain or earthen ware, or other material, either originally made without a handle, or from which the handle has become accidentally broken.

In order to provide a handle for such a cup, there are formed two rings 2 and 3 spaced one from the other and joined by a coupling member 4 shaped after the manner of an ordinary cup handle. Now, if these two rings are in alinement one with the other, and the cup is slightly conical, and if the ring 3 be made a little smaller than the ring 2, then the cup may be inserted through the upper ring and will rest firmly in the two rings, the latter being properly spaced by the taper body of the cup. However, cups are made with a somewhat taper bottom but with the body portion practically cylindrical. Under such circumstances, the rings 2 and 3 will no longer hold the cup with any degree of certainty, and the handle, unless made very heavy and rigid, will be liable to be bent and the upper ring 2 be thrown out of alinement with the lower ring, or even be pulled off the top of the cup.

Now, in order to adapt the structure to cups having cylindrical bodies, or substantially cylindrical bodies, the upper ring 2 is split, one end being formed integral with the handle portion and suitably recessed, as indicated at 5, while the other, or free, end of the ring is formed with an enlarged head 6 adapted to be seated in the recess 5 where it may be firmly secured by a set screw 7 passing through the handle portion 4 and entering a suitable nut formed in the head 6. Now, by proportioning the parts, the ring 2 may be made with its interior diameter, when the head 6 is seated in the recess 5, a little less than the exterior diameter of the cup 1. When the cup is placed in the rings 2 and 3, the lower ring, which may be made a little smaller than the outer diameter of the cylindrical portion of the cup, will receive and retain the bottom portion of the cup, but, being non-extensible, cannot move far enough on the cup to reach the cylindrical portion thereof. Under these circumstances, the cup is seated in the ring 3, but cannot move through the same. Now, because the upper ring 2 is split, and being made of metal or similar material is somewhat elastic, the spring may be expanded somewhat so as to easily receive the cylindrical portion of the cup. The head 6 is then brought into as close relation to the recess 5 as may be, and the screw 7 is turned in a direction to bring the head 6 well within the recess 5, thus bringing any desired clamping pressure to bear upon the exterior of the cup 1. In this way, the ring 2 is firmly attached to the cup, even though the body be cylindrical, and there is no danger of the ring 2 slipping from its place, and therefore the handle will retain its shape without danger of breakage.

By forming the recess 5 in the handle 4, and forming the head 6 on the free end of the ring 2, ample strength is provided at this point while there is produced a neat exterior finish. At the same time, the handle may be quickly removed from the cup, and the whole structure, both handle and cup, may be readily cleansed from any accumulated dirt.

What is claimed is:—

A cup handle comprising two spaced rings one larger than the other and a connecting member integral with both rings and constituting a hand hold, the smaller of said rings being unbroken and tapered to receive the tapered portion of the cup and the other or larger ring being untapered and split, with its free end formed into a head and the other end formed with a recess at its juncture with the hand hold, said recess being shaped to receive and seat the headed end of the ring, and means for coupling the two ends of the split ring when the head is seated in the recess, said coupling means acting in a direction to draw the ends of the ring together.

In testimony that I claim the foregoing as my own, I have hereto affixed my signature in the presence of two witnesses.

CHARLES THESSEN.

Witnesses:
J. HUNSAKER,
R. E. WINTON.